Figure 3:
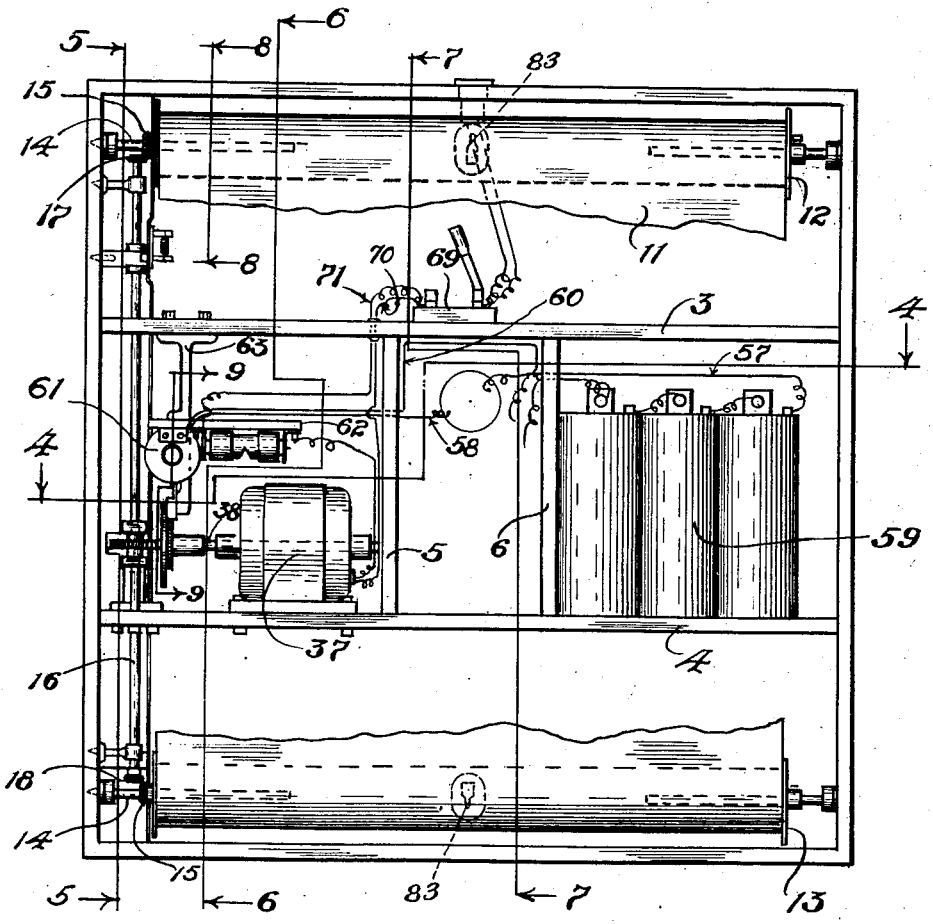

A. H. WILKE.
ADVERTISING CLOCK.
APPLICATION FILED DEC. 18, 1913.
1,182,952.
Patented May 16, 1916.
5 SHEETS—SHEET 1.
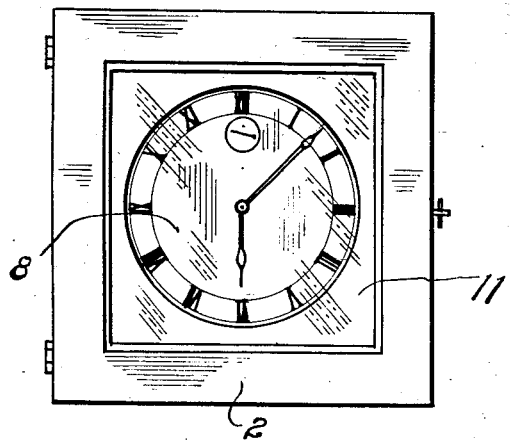
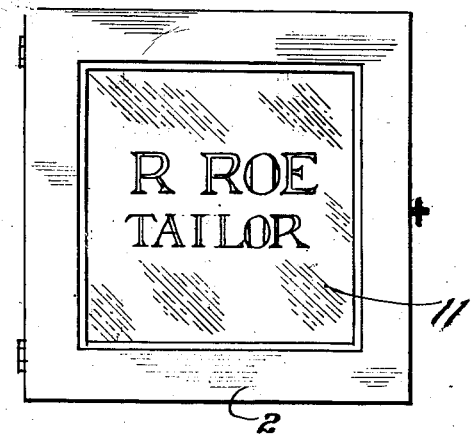
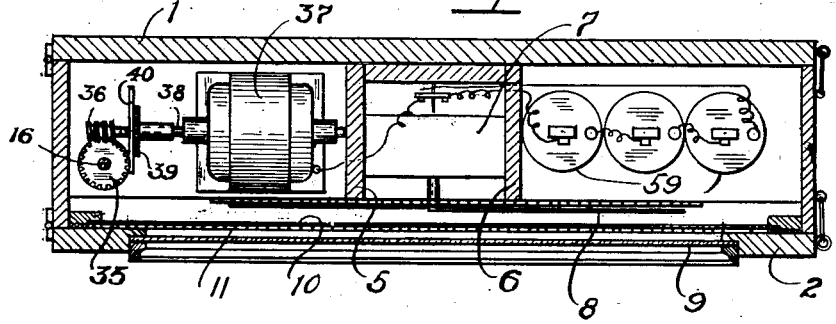
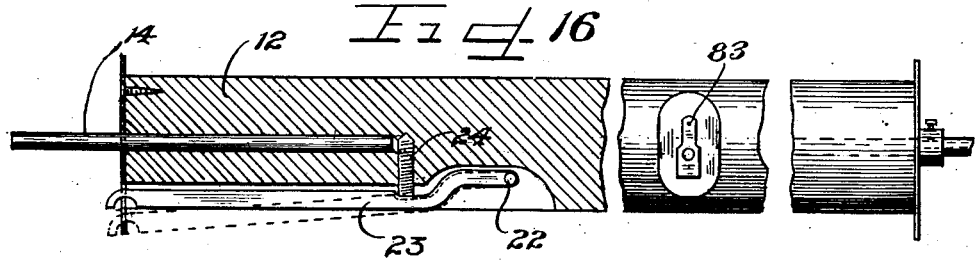

A. H. WILKE.
ADVERTISING CLOCK.
APPLICATION FILED DEC. 18, 1913.

1,182,952.

Patented May 16, 1916.
5 SHEETS—SHEET 2.

Witnesses
Victor Siljander
Charles W. Hill

Inventor
Albert H. Wilke
Charles W. Hill
Atty

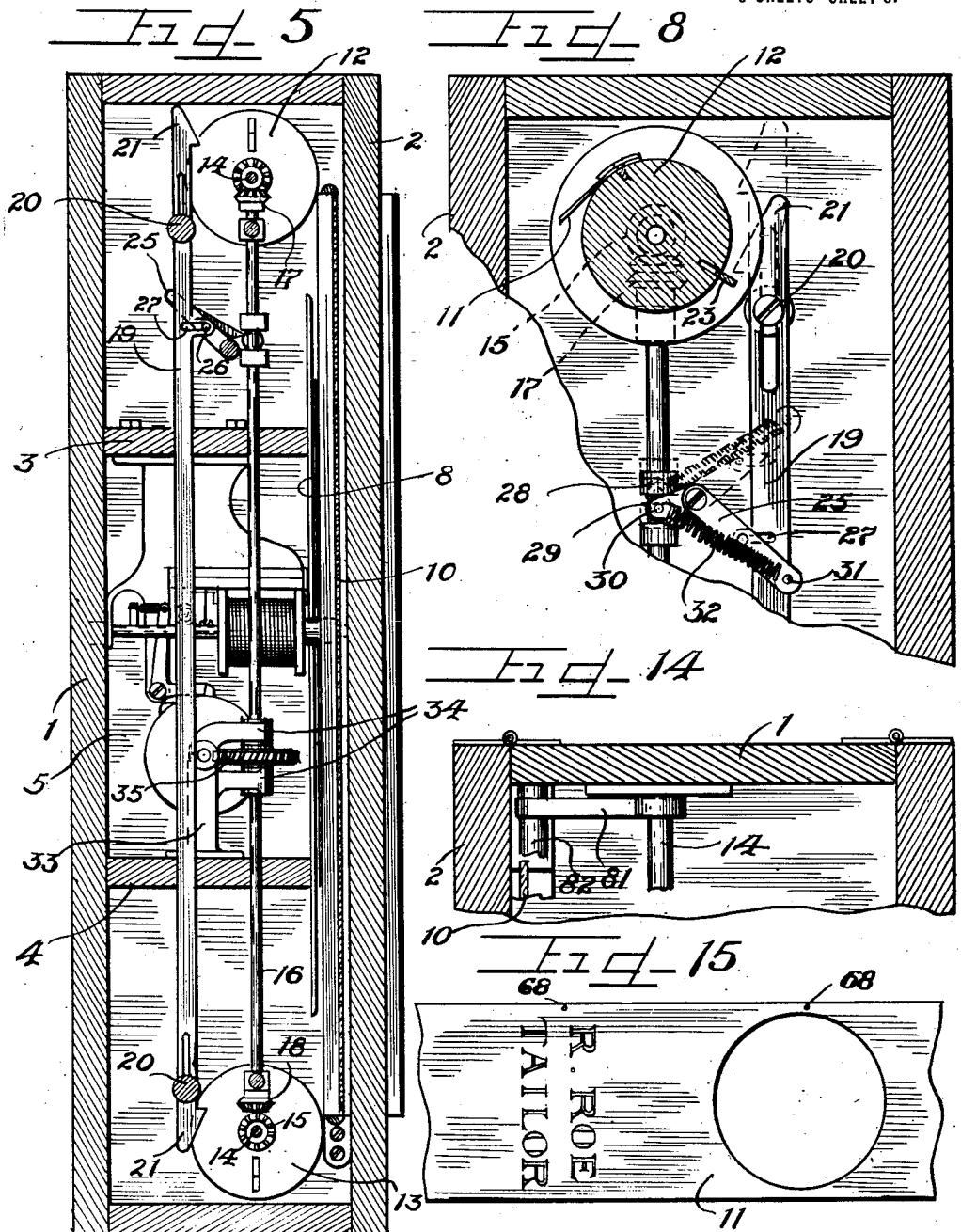

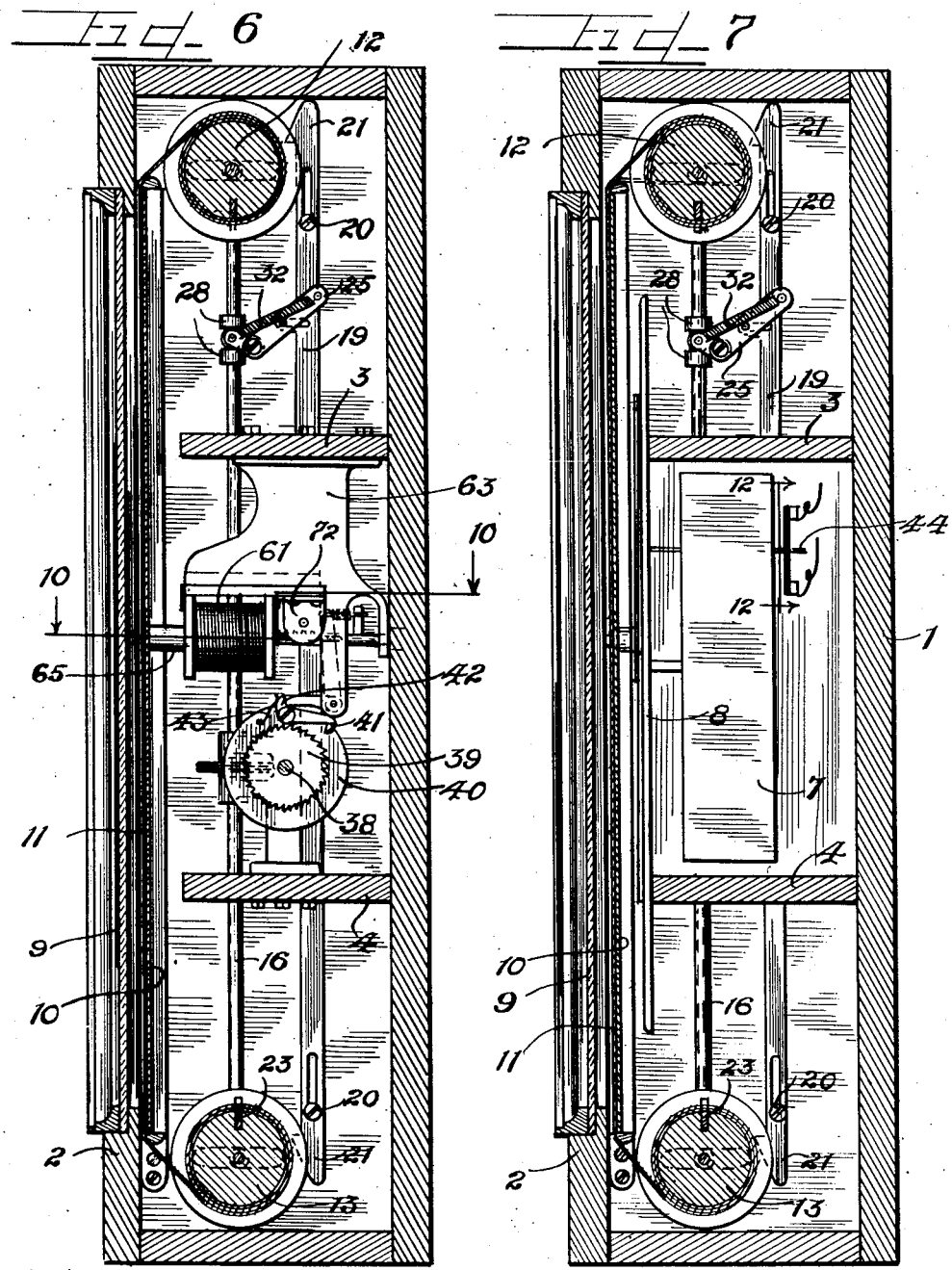

A. H. WILKE.
ADVERTISING CLOCK.
APPLICATION FILED DEC. 18, 1913.
1,182,952.
Patented May 16, 1916.
5 SHEETS—SHEET 5.
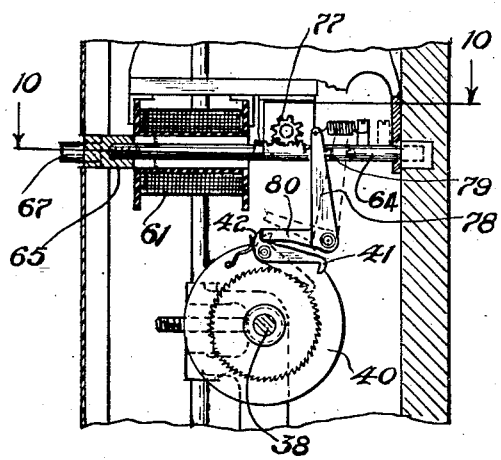
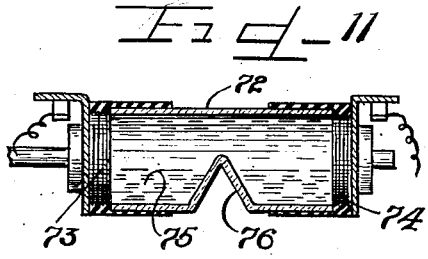
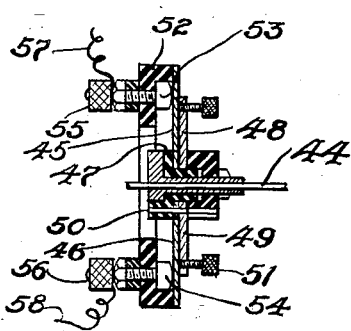
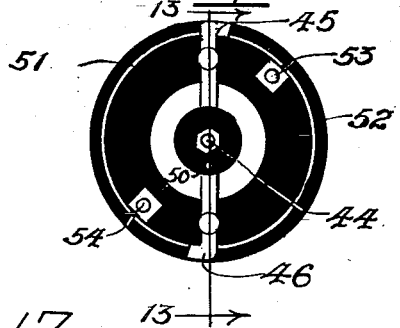
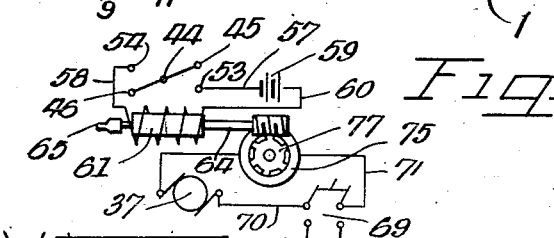
WITNESSES
Victor Siljander.
INVENTOR
Albert H. Wilke
Atty

UNITED STATES PATENT OFFICE.

ALBERT H. WILKE, OF CHICAGO, ILLINOIS.

ADVERTISING-CLOCK.

1,182,952.  Specification of Letters Patent.  Patented May 16, 1916.

Application filed December 18, 1913. Serial No. 807,407.

*To all whom it may concern:*

Be it known that I, ALBERT H. WILKE, a citizen of the United States, and a resident of the city of Chicago, in the county of Cook and State of Illinois, have invented certain new and useful Improvements in Advertising-Clocks; and I do hereby declare that the following is a full, clear, and exact description of the same, reference being had to the accompanying drawings, and to the numerals of reference marked thereon, which form a part of this specification.

This invention relates to an advertising device wherein the face of a clock is alternately exposed to view by a display mechanism, which, at certain intervals, covers the face of the clock. The display mechanism embraces a long curtain which winds between two rolls over the face of the clock, and has painted or printed thereon advertising matter. Between each of the signs on said display curtain are apertures sufficiently large to expose the face of the clock to view, and a motor driven mechanism controlled by the mechanism of the clock itself serves to actuate the rolls periodically. Automatic reversing mechanism is provided for rewinding the rolls, and of course the same sequence of operation takes place during the reversal of the rolls as during forward movement thereof.

It is an object of this invention to provide a display device serving as an advertising medium, whereby the face of a clock is intermittently exposed to view and at other times is covered by a curtain carrying advertising matter thereon.

It is also an object of this invention to construct a device wherein a long continuous display curtain is adapted to move across the face of a clock stopping periodically in its course of movement to expose the face of the clock to view or to cover the same with a display sign.

It is also an object of this invention to construct an advertising display device wherein a clock is exposed to view from time to time, and at other times advertising matter is disposed over the face of the clock concealing the same from view, the mechanism for operating said device comprising an electric motor and electrical connections periodically opened and closed by the clockwork mechanism itself.

It is also an object of this invention to construct a device embodying a continuous apertured curtain adapted to move across the face of a clock, said curtain between the apertured portions bearing advertising matter, and mechanism for driving and stopping the curtain at certain timed intervals determined by the clockwork mechanism.

It is also an object of this invention to construct a continuously operating automatically controlled display device associated with a clock whereby the face of the clock is exposed to view from time to time, and in which the advertising medium is driven to one extreme position and then automatically reversed to initial position without requiring manual adjustment.

It is furthermore an object of this invention to construct an electrically driven advertising medium controlled by a clockwork mechanism through which the face of a clock is alternately exposed to view.

It is finally an object of this invention to construct a device simple in operation and automatically controlled by electrical and clockwork means so as to operate continuously without manual adjustment.

The invention (in a preferred form) is hereinafter more fully described and defined in the accompanying drawings and specification.

In the drawings: Figure 1 is a front elevation of a device embodying the principles of my invention, with the face of the clock exposed to view. Fig. 2 is a similar view with the advertising medium covering and concealing the face of the clock. Fig. 3 is a front elevation of the interior of the device with the clockwork mechanism removed and other parts broken away. Fig. 4 is a section on line 4—4 of Fig. 3. Fig. 5 is a section on line 5—5 of Fig. 3. Fig. 6 is a section on line 6—6 of Fig. 3. Fig. 7 is a section on line 7—7 of Fig. 3. Fig. 8 is an enlarged detail section on line 8—8 of Fig. 3, with parts broken away and parts shown in elevation. Fig. 9 is a fragmentary section taken on line 9—9 of Fig. 3. Fig. 10 is a section on line 10—10 of Fig. 9. Fig. 11 is a central longitudinal vertical section taken through the mercury contact member. Fig. 12 is a section on line 12—12 of Fig. 7. Fig. 13 is a section on line 13—13 of Fig. 12. Fig. 14 is a fragmentary sectional detail taken at the upper end of the device, illustrating the glass retaining device. Fig.

15 is a fragmentary view of a portion of the display curtain. Fig. 16 is a view partly in section and partly broken away, illustrating the construction of one of the display curtain rolls. Fig. 17, is a diagram of the electrical connections, showing the auxiliary battery circuit in conjunction with the main circuit.

As shown in the drawings, the device is contained within a casing, denoted as a whole by the reference numeral 1, and having a door 2, hinged on the front thereof. The side walls of the casing 1, are also hingedly connected to the rear wall thereof, thus, when the casing is opened on all of its hinges, permitting access to all the parts of the mechanism. Extending horizontally through the casing are shelves denoted respectively as 3, and 4, and also vertical partitions 5, and 6, extend between said shelves 3 and 4, near the middle thereof. A clockwork mechanism 7, is mounted in the compartment afforded by said shelves 3 and 4, and between the partitions 5, and 6, with the rear side of the face 8, lying against the forward end of said shelves and partition members. The door 2, is provided with an outer protecting light of glass 9.

An inner light of glass 10, affords a tracking surface which is spaced a distance from the inner surface of the door at the top and bottom ends thereof to permit passage of a display curtain 11, thereover.

Upper and lower winding rolls 12, and 13, respectively, are mounted within the casing at points substantially above and below the ends of the light of glass 10, to receive the display curtain wound thereon. For the purpose of driving said rolls, a stud shaft 14, extends coaxially within one end of each of the rolls, and is rigidly secured therein, each of said shafts having rigid thereon a bevel pinion 15. A rotatable vertical driving shaft 16, is slidably mounted at one end of the casing in suitable bearings attached thereto, and has secured at its ends the respective bevel pinions 17, and 18, the former adapted to mesh with the bevel pinion 15, on the upper roll and the latter upon the bevel pinion 15, upon the lower roll. However, the length of the shaft permits only one of said bevel pinions 17, or 18, to mesh at one time. Of course, the direction of drive of said respective rolls 12, and 13, for the display curtain depends upon which of the bevel pinions on said vertical slidable shaft 16, are in mesh. Accordingly, for the purpose of reversing the drive when all of the curtain except the attached extremity thereof has been unwound from one of the rollers, a slotted vertically slidable actuating bar 19, is provided mounted parallel to, and adjacent said shaft 16. Screws 20, on the casing, engage through the slots in said bar to limit the movement thereof and retain the same in proper position on the casing. At each of its ends said bar 19, is provided with a hooked extremity 21, which projects closely to, but not in contact with the periphery of the curtain 11, wound upon said rolls. As shown clearly in Fig. 16, each of said rollers is longitudinally recessed from one end to near the middle thereof, and mounted in said recess upon a pivot pin 22, is a bent rod 23, which is normally impelled outwardly from the curtain roll by means of a spring 24. Said bar is normally held within its recess by the folds of the curtain wound upon the roller, but when the curtain has been entirely unrolled from one of said rollers said bar 23, is thrown outwardly into the position shown in dotted lines under the impulse of said spring 24. With a continued revolution of the roller, as shown in Fig. 8, one of the hooks 21, of said slidable bar is caught by said rod, thus sliding the bar from one extreme position to the other. This movement of the bar 19, causes a reversal in the movement of the winding rolls, by shifting the shaft 16, and this is accomplished by mechanism connected between said shaft and said slidable bar 19. Said mechanism comprises a lever 25, which is pivoted upon one of the end walls of the casing 1, and has rigidly secured thereon a laterally projecting pin 26, which engages in a horizontally directed slot 27, formed in said actuating bar 19. A pair of collars 28, are rigidly secured upon said slidable vertical shaft 16, and loosely pivoted upon the pin or studs for said lever 25, is a short lever 29, the end of which engages loosely over said vertical shaft 16, between said collars 28. A pin 30, projects laterally from the end of said short lever 29, and another pin 31, projects outwardly from the extremity of said lever 25, said pins affording a connection for a spiral tension spring 32, therebetween. Accordingly, referring to Fig. 8, when the actuating bar 19, is lifted upwardly by contact with the rod 23, on the roller 12, owing to the pin and slot engagement between the bar 19, and the lever 25, said lever 25, is elevated into the position shown in dotted lines. As said lever 25, is elevated past a horizontal or dead center position the spiral spring 32, pulls upwardly upon the loose lever 29, thus elevating and holding the slidable shaft 16, and causing the pinion 17, on the upper end thereof, to mesh with the pinion 15, on the roller 12, to drive the same and rewind the curtain.

A bearing bracket 33, is mounted upon said lower shelf 4, and is provided with outstanding arms 34, through which the slidable shaft 16, extends. Mounted between said arms 34, and feathered upon the shaft 16, is a worm wheel 35, which meshes with a worm 36, to drive said vertical shaft. A motor 37, is mounted upon said shelf 4, for the purpose of driving said worm, and a mechanism is provided for alternately connecting and disconnecting the motor shaft 38, from said worm 36, which is loose upon said shaft. The entraining mechanism embraces a ratchet wheel 39, which is rigidly secured upon said motor shaft 38, and a pawl carrying wheel 40, which is rigidly connected with the worm 36, and is likewise loose upon said shaft 38. A pawl 41, is pivoted on said wheel 40, and is provided with an integral short tail piece 42, against the rear surface of which a small leaf spring 43, also mounted on said wheel 40, bears, to impel the pawl 41, into engagement with the ratchet wheel 39. When said pawl 41, is in engagement with the ratchet wheel, of course the pawl carrying wheel and worm are driven by the motor shaft, and when said pawl is lifted out of engagement with the ratchet wheel, the motor shaft is free to rotate without driving the worm. The driving mechanism is so timed that one complete revolution of the pawl carrying wheel 39, causes the display curtain 11, to be moved a distance equal to the space between a view aperture for the face of the clock or to cover the same with a sign.

Mechanism for closing the motor circuit to drive the motor at the proper intervals is provided, and embraces an auxiliary minor electric circuit which is periodically closed by a contact wheel mounted upon the second hand shaft of the clockwork mechanism. For this purpose the second hand shaft 44, is extended through the rear wall of the clockwork mechanism casing and rigidly secured on and insulated from said shaft are contact arms 45, and 46, respectively, which are integral with one another and centrally apertured at their middle to permit insertion of the second hand shaft 44, and an insulating bushing 47, therethrough. Similarly integrally connected stiff metal arms 48, and 49, respectively, are insulated from and rigidly mounted upon the second hand shaft, and a pin 50, extends through said insulating bushing 47, and said arms 46, and 49, to lock the parts rigidly together. Thumb screws 51, are threaded into the extremities of said arms 48, and 49, respectively, to bear against said respective contact arms 45, and 46, to vary the contact pressure thereof. A fixed insulating ring 52, is mounted concentric with said shaft 44, and provided with a pair of contact pins 53 and 54. Binding posts 55, and 56, respectively, are mounted on the rear of said insulating ring 52, and are in electrical communication with the respective contact points 53, and 54. Accordingly, as the integral arms 45, and 46, due to the rotation of the second hand shaft 44, sweep around said insulating ring 52, at every half revolution said contact points 53, and 54, are connected together, thus permitting an instant flow through the wires 57, and 58, forming one branch of the auxiliary electrical circuit. The other end of said wire 57, is connected to a number of dry batteries connected in series, and denoted by the reference numeral 59, standing upon the shelf 4, in the compartment between the partition 6, and one end wall of the casing of the device. The other branch or wire of the auxiliary electrical circuit is denoted by the reference numeral 60, and, together with the end of said wire 58, is connected to a solenoid 61, which is mounted upon a horizontal plate 62, depending from the upper shelf 3, by means of a downwardly directed bracket 63.

A rod 64, carrying a soft iron core 65, for the solenoid is slidably mounted within the same, a spiral tension spring 66, serving to hold said rod in a position with the soft iron core 65, withdrawn from the solenoid. The outer end of said core 65, is reduced in diameter at 67, and is adapted to project through an aperture in the light of glass 10, to engage apertures 68, in the display curtain to stop the same in its movement over the face of the clock, in a predetermined position.

A switch 69, is provided in the main electrical circuit, for the motor 37, said switch being mounted upon the shelf 3, in a convenient position, and one of the leads 70, from said switch is connected directly to one of the terminals of the motor 37. The circuit of the other lead 71, from said switch 69, is normally broken by a mercury contact member, which consists of a glass cylinder 72, having secured in each end thereof electrical contact members 73, and 74, respectively. Said cylinder contains a quantity of mercury 75, which, when said cylinder is in normal position is separated into two parts by a partition 76, so that the contact members 73, and 74, are not in electrical communication with one another. However, electrical communication is established between said contact members by rotating the glass cylinder about its longitudinal axis, inasmuch as the partition 76, will then be moved upwardly, allowing the two quantities of mercury to join with one another. For the purpose of rotating said glass cylinder, which is journaled in brackets depending from the sub-shelf 62, a small pinion 77, is rigidly secured to an extension on the contact portion 73, and said pinion meshes with a rack formed on the upper side of said slidable rod 64. Accordingly, as the contact arms 45, and 46, mounted upon the second hand shaft, momentarily close the auxiliary electrical battery circuit, the solenoid 61, is energized and the soft iron core 65, thereby is drawn inwardly. The movement of the rod 64, causes the pinion 77, to be driven by the rack, with a consequent rotation of the mercury container, and this of course closes the main electrical circuit, or that leading to the motor. As already pointed out, the motor is normally out of train with the worm 36, which is loosely mounted on the motor shaft, and accordingly means are provided for simultaneously entraining the motor as the current is switched on. This mechanism comprises a bell crank lever, which is pivoted upon a downwardly directed extension of the bracket 63, one arm 78, of said lever engaging between two pins 79, on said rod 64, to cause actuation of the lever with movement of said rod. The other arm 80, of said lever, extends into a position to contact the tail 42, of the pawl 41, to retract the same from engagement with the ratchet wheel, when said rod 64, is in the retracted position shown in Fig. 9.

As shown clearly in Fig. 14, a resilient arm 81, extends outwardly from the bearing supporting the shaft 14, on the upper roll 12, and rests upon a beading or strip 82, which fits over and along the upper edge of the light of glass 10, affording a smooth tracking surface for the display curtain, and as well preventing removal or upward movement of the glass. A similar construction is provided at the lower end of the casing on the under side thereof.

The operation is as follows: The second hand shaft, which is continuously rotating, periodically closes and opens the auxiliary electrical circuit, thus momentarily energizing the solenoid 61. When the solenoid is energized, of course the soft iron core is drawn inwardly, thus causing a longitudinal movement of the rod 64, which not only serves to release the pawl 41, by movement of the bell crank lever 78, but also causes a rotation of the mercury container, thereby closing the main electrical circuit leading to the driving motor 37. Inasmuch as one or the other of the pinions 17, or 18, respectively, are in mesh with one of the respective pinions 15, on either the upper or lower winding rolls, the roll is thereby rotated an amount sufficient to shift the display curtain the proper distance. Not only does movement of said actuating rod 64, permit entrainment of the motor and the worm on the shaft thereof, as well as closure of the main electrical circuit, but the reduced end 67, of the iron core, is withdrawn through the aperture in the tracking glass plate 10, and out of engagement with the respective aperture 68, in the display curtain, thus permitting movement of the latter. Inasmuch as the closure of the auxiliary circuit is only momentary, the actuating rod 64, tends to return immediately to normal position, so that when the next succeeding aperture 68, in the display curtain passes over the corresponding aperture in the tracking glass plate 10, the reduced end 67, of the iron core is projected therethrough, thus stopping the movement of the curtain. This movement of the rod breaks the main electrical circuit and furthermore moves the bell crank into a retracted position to engage the tail 42, of the pawl 41, and disentrain the driving mechanism from the actuating mechanism of the curtain. The winding rolls 12, and 13, respectively may each be removable from the device or only one thereof, as desired, and the display curtain 11, may be permanently attached thereto or releasably so, at its ends, as desired. However, in the embodiment of my invention herein set forth I have shown both ends of the display curtain releasably connected by means of hooks 83, as indicated in Figs. 3 and 16.

I am aware that various details of construction may be varied through a wide range without departing from the principles of this invention. I therefore do not purpose limiting the patent granted otherwise than necessitated by the prior art.

I claim as my invention:

1. An advertising device, comprising a clock, a display curtain adapted to move over the face of said clock and having apertures therein to display the face of the clock therethrough, said apertures alternating with display spaces, and mechanism controlled by the clockwork for driving said curtain periodically and for stopping the same with the display spaces and the apertures alternately registering with the face of said clock.

2. An advertising device, comprising a clock, rollers mounted above and below said clock, a display curtain wound upon said rollers and adapted to move over the face of said clock and having apertures therein to display the face of the clock therethrough, said apertures alternating with display spaces, mechanism controlled by the clockwork for driving said curtain periodically and for moving the same with the display spaces and the apertures alternately registering with the face of said clock, and means operated by the drive mechanism for periodically reversing the direction of movement of said curtain.

3. An advertising device, comprising a clock, a display curtain adapted to move over the face of said clock and having apertures therein to display the face of the clock therethrough, said apertures alternating with display spaces, electrical means for driving said curtain, and an auxiliary electric circuit governed by the clock to control the electrical drive circuit, whereby said curtain will be stopped periodically with its display spaces and the apertures alternately registering with the face of said clock.

4. An advertising device, comprising a clock, a display curtain adapted to move over the face of said clock and having apertures therein to display the face of the clock therethrough, said apertures alternating with display spaces, a main electrical mechanism for moving said curtain, mechanism for positively engaging and stopping said curtain, and auxiliary electrical mechanism controlled by the clockwork mechanism and adapted to control said curtain stopping mechanism and simultaneously to cause the main electrical circuit to open at proper intervals.

In testimony whereof I have hereunto subscribed my name in the presence of two subscribing witnesses.

ALBERT H. WILKE.

Witnesses:
CHARLES W. HILLS, JR.
FRANK K. HUDSON.